May 29, 1956    R. P. GARRISON ET AL    2,747,882

GEAR CHUCK

Filed Sept. 28, 1953

*INVENTORS*
RALPH P. GARRISON
JAMES O. GARRISON
DAVID D. WALKER
By *Tom Walker*

United States Patent Office 2,747,882
Patented May 29, 1956

2,747,882
GEAR CHUCK

Ralph P. Garrison, James O. Garrison, and David D. Walker, Dayton, Ohio, assignors to Garrison Machine Works, Inc., Dayton, Ohio, a corporation of Ohio Application September 28, 1953, Serial No. 382,702

11 Claims. (Cl. 279—106)

This invention relates to chucks, and more particularly to a chuck wherein a plurality of swinging chuck jaws are adjustable to gripping and releasing positions.

The object of the invention is to simplify the construction as well as the means and mode of operation of chucks, whereby such chucks may not only be economically manufactured, but will be more efficient and satisfactory in use, adaptable to a wide range of work pieces, while having relatively few parts and be unlikely to get out of repair.

A further object of the invention is to facilitate the simultaneous adjustment of the chuck jaws.

Another object of the invention is to place the several chuck jaws under common control, there being provided on the chuck body a concentric actuating ring making common contact with the jaws.

A further object of the invention is to utilize a principle of spring control for maintaing a yielding, operative engagement of the chuck jaws with the actuating ring.

Still another object of the invention is to provide for gripping and releasing motions of the chuck jaws under influences of inertia.

A further object of the invention is to provide a chuck possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawing, wherein is shown one, but obviously not necessarily the only form of embodiment of the invention, Fig. 1 is a fragmentary view in top plan of a chuck assembly in accordance with one illustrated form of the invention;

Like parts are indicated by similar characters of reference throughout the several views.

Figures 1, 2:
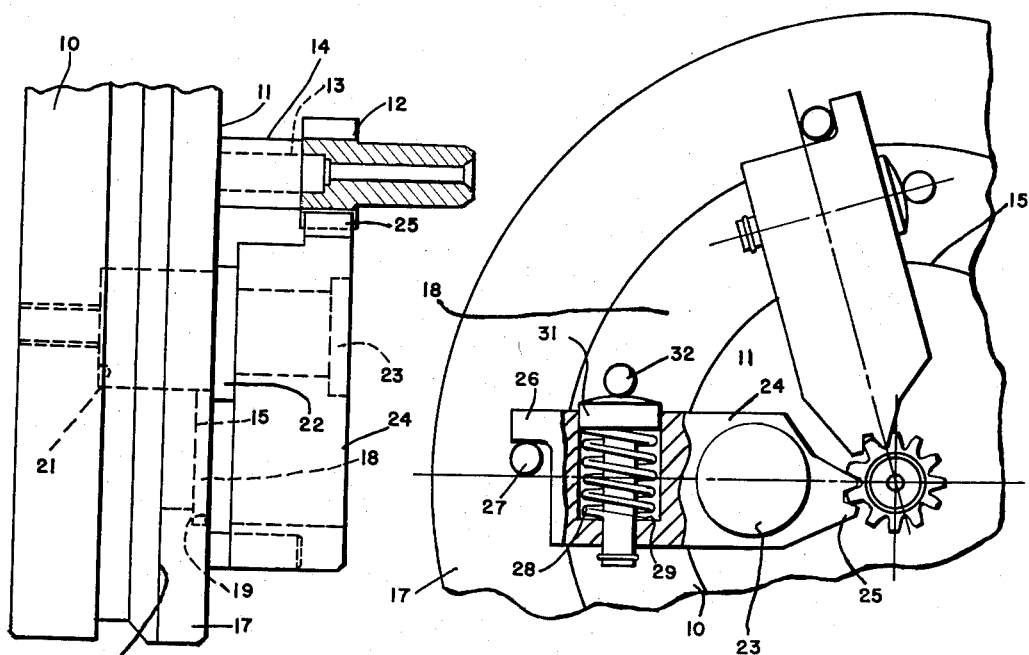
Fig. 2 is a fragmentary view in side elevation of the assembly of Fig. 1.

Referring to the drawing, a chuck in accordance with the first considered embodiment of the invention includes, as shown in Figs. 1 and 2, a rotary cylindrical body 10 constructed and arranged to be made fast to the spindle of a suitable machine tool. The front surface of the body 10 has a central area or land 11 on which the work piece to be held is installed. In the illustrated instance a spur gear 12 is the part being held, and a suitable supporting means is provided for the initial centering of the part and to hold it elevated from the land 11, such means including a stud 13 and sleeve 14.

Radially outward of the land 11, the body 10 is formed with an annular recess 15, the outer edge of which merges with a further stepped down peripheral recess 16. An actuating ring 17 is mounted in the recess 16. A retaining ring 18 is mounted in the recess 15 and holds the ring 17 installed on the body 10 while permitting relative rotary movement thereof. The inner periphery of the ring 17 has a cut out portion 19 mating with the recess 15 to receive the retaining ring 18.

Arranged in a circumferential series about the axis of the body 10, in the land 11, are bores 21 mounting bushings 22, the latter serving as bearings for studs 23. Sector arms 24 are installed on the body 10 by means of the studs 23, one of which is passed through each arm 24 intermediate the ends thereof in such manner that the arms are capable of swinging rocking motion about the studs.

The sector arms 24 function as chuck jaws. One end of each arm substantially faces the axis of the body 10 and is formed with a rack-like series of teeth 25 engageable with the teeth of the spur gear 12 or other part which may constitute the work piece. The several jaws cooperate in gripping and holding the work piece, and it will be understood that if the jaws are rocked simultaneously, or substantially so, about the axes of the studs 23 they may be moved alternatively to gripping and releasing relation to the work piece.

The opposite end of each arm 24 extends toward the peripheral area of the body 10 and terminates in a finger 26 overlying the actuating ring 17. The finger 26 is cooperable with abutment means on the ring 17, in the form of a stud 27. The arrangement of parts is such that if the actuating ring 17 is turned in a clockwise direction (Fig. 1) the several sector arms 24 will be rocked also in a clockwise direction, disengaging the teeth 25 from the gear 12.

A cooperative relationship is maintained between the finger 26 and stud 27 by a spring 28 seated in a recess 29 in the arm 24 and bearing on a pin 31. The pin is thereby placed in thrust engagement with a stud 32 set in the chuck body and passed through the retaining ring 18.

The actuating ring 17 is adjustable by hand. The turning thereof in a clockwise direction, as before described, serves to release the gear 12 for removal from the chuck and serves also to compress the springs 28. Now when the actuating ring 17 is released it is returned in a counterclockwise direction by the springs 28, acting through the arms 24 which rock also in a counterclockwise direction back to gripping position. If, while the sector arms or chuck jaws were held in releasing position, another work piece was installed on the chuck body then the return motion of the jaws will "lock up" or grip the new work piece.

Figure 3:
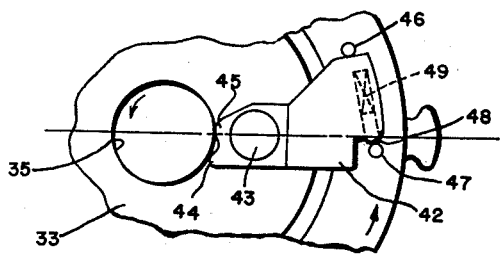
Fig. 3 is a fragmentary view, similar to Fig. 1 but at a reduced scale, of a chuck assembly in accordance with another illustrated form of the invention.
Figure 4:
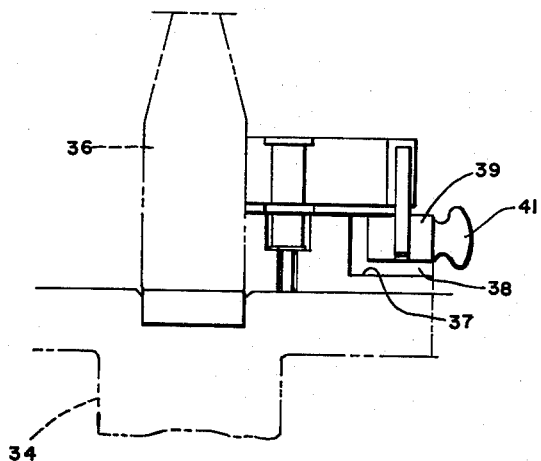
Fig. 4 is a view in side elevation of the assembly of Fig. 3.

In that form of the invention disclosed in Figs. 3 and 4, a chuck body 33 is attached to a spindle 34 and has a central opening 35 to receive a work piece 36 which in this instance is illustrated as a shell casing.

A peripheral cut out 37 in the body 33 has a liner 38 therein and supports an actuating ring 39 formed with a knob 41 for hand adjustment of the ring. Chuck jaws 42, corresponding in function and generally in mode of operation to the jaws 24, are pivotally mounted by studs 43 on the body 33. The gripping portion of each jaw 42 has undulations 44 and 45, one relatively longer than the other so that the jaws may be effective upon work pieces of different diameter.

The other end of each of the chuck jaws 33 overlies the actuating ring 39 and is interposed between a pair of studs 46 and 47 both set in the ring 39. A plunger 48 is carried by the chuck jaw and is urged by a spring 49 to abutting engagement with the stud 47, the reaction of such pressure being exerted in a direction to maintain the jaw in engagement with the stud 46. The spring pressed plunger 48 in effect is a yielding extension of the jaw 42 whereby such jaw effectively bridges the space between adjacent studs 46 and 47.

The device of Figs. 3 and 4 is operable in two ways, manually and under the forces of inertia. In order to manually release the jaws from the gripping position shown, the ring 39 is moved in a counterclockwise direction (Fig 3). Through the stud 47, plunger 48 and spring 49 the jaws 42 are rocked similarly in a counterclockwise direction, releasing the work piece 36. To lock up or grip the work piece, the ring 39 is moved in the opposite direction, effecting a corresponding motion of the jaws 42 through contact of the studs 46 therewith.

Under the principle of inertia operation, if rotation of the chuck body is started with the chuck jaws open or released there is an initial motion of the body relative to the ring 39. Since the running motion of the body is counterclockwise, and since the outer ends of the jaws are held relatively inflexibly between respective pairs of studs 46 and 47 there is a pivotal motion of the jaws 42, during such initial relative movement of the body, corresponding to that effected by manually turning the ring 39 in a clockwise direction. Accordingly the jaws are moved to a locking or gripping position. When the chuck body stops, the ring 39 tends to continue in a counterclockwise direction, sufficient relative motion taking place to rock the chuck jaws to a releasing position.

In each of the illustrated embodiments of the invention, the actuating ring is supported on the chuck body and tends to rotate with it. In order to positively cause the ring 17 so to rotate, the jaw 24, plunger 31, stud 32 and finger 26 are so arranged that a counterclockwise motion of the chuck body substantially fixes the jaw in a driving relationship to the stud 27 on ring 17. To cause the ring 39 to so rotate, the studs 46 and 47, and work engaging portions 44 and 45 are so arranged as to compel a driving relationship of the chuck jaws to the ring 39, when jaws are in gripping or closed position.

From the above description it will be apparent that there is thus provided a device of the character described possessing the particular features of advantage before enumerated as desirable, but which obviously is susceptible of modification in its form proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described our invention, we claim:

1. A chuck, including a rotary body having a central work piece mounting area, a series of chuck jaws in surrounding relation to said central area, said jaws being pivotally mounted on said body, a relatively rotatable ring supported on said body in concentric relation to said central area, portions on said ring engaging said jaws and rocking said jaws between gripping and releasing positions of adjustment in response to relative rotary motion of said body and ring, and spring means maintaining said portions in engaging relation to said chuck jaws.

2. A chuck, including a rotary body having a central area for mounting a work piece and a peripheral area, a series of chuck jaws in surrounding relation to said central area, each of said jaws having a gripping portion extending toward said central area, said jaws being pivotally connected to said body intermediate said portions, a ring installed in the peripheral area of said body for relative rotary motion, means on said ring for effecting gripping and releasing movements of said chuck jaws in response to relative rotary motion of said body and ring, and spring means establishing a yielding contact of said chuck jaws with said last named means.

3. A chuck, including a rotary body having a central area for mounting a work piece, a series of chuck jaws in surrounding relation to said central area, said jaws being pivotally mounted on said body, a ring supported on said body for relative rotary motion and in concentric relation to said central area, abutment portions on said ring, and spring means based on said body urging said jaws into engagement with respective abutment portions, said ring being adjustable to effect gripping and releasing movements of said chuck jaws.

4. A chuck, including a rotary body having a central area for mounting a work piece and a peripheral area, a series of chuck jaws in surrounding relation to said central area, each of said jaws having a gripping portion extending toward said central area and an operating portion extending toward said peripheral area, said jaws being pivotally connected to said body intermediate said portions, a ring installed in the peripheral area of said body for relative rotary motion, abutment means on said ring engageable with one side edge of the operating portion of each of said jaws and spring means based on said body urging said chuck jaws into engagment with said abutment means.

5. A chuck, including a rotary body having a central area for mounting a work piece, a series of chuck jaws in surrounding relation to said central area, said jaws being pivotally mounted on said body, a ring supported on said body for relative rotary motion and in concentric relation to said central area, abutment portions on said ring in cooperative relation with opposing side edges of each of said jaws, adjacent pairs of said abutment portions cooperating to effect opposed gripping and releasing movements of said chuck jaws in response to relative motion between said body and said ring in an oscillatory sense, and a compression spring interposed between one of said abutment portions and its respective side edge of each of said jaws.

6. A chuck, including a rotary body having a central area for mounting a work piece, and a peripheral area, a series of chuck jaws in surrounding relation to said central area, each of said jaws having a gripping portion extending toward said central area and an operating portion extending toward said peripheral area, said jaws being pivotally connected to said body intermediate said portions, a ring installed in the peripheral area of said body for relative rotary motion, abutment means on said ring engageable with the opposite side edges of the operating portion of each of said jaws, each of said chuck jaws being received between adjacent pairs of abutment means on said ring, and spring means based on one abutment means of each pair urging the associated chuck jaw into abutting relation with the other abutment means of the pair, said ring having inertia initiated relative movement in response to the starting and stopping of rotary motion of said body to effect simultaneous gripping and releasing motions of said jaws.

7. A chuck, including a rotary body presenting a substantially planar surface on which a work piece is mounted, an annular groove in radially spaced relation to said surface, sector arms substantially radially disposed on said body having their one ends in relatively projecting, overlying relation to said planar surface and their other ends in similar relation to said groove, means pivotally connecting said arms to said body intermediate their ends, a ring rotatably mounted in said groove, stud means engageable with opposite side edges of each of said sector arms, at least one of said stud means being set in said ring, and compression spring means interposed between the other stud means and the respective side edge of each of said sector arms.

8. A chuck according to claim 7, characterized in that said other stud means also is set in said ring.

9. A chuck according to claim 7, characterized in that said other stud means is set in said body in circumferential and radially spaced relation to the said one stud means.

10. A chuck, including a rotary body presenting a substantially planar surface on which a work piece is mounted, an annular groove in radially spaced relation to said surface, sector arms substantially radially disposed on said body having their one ends in relatively projecting, overlying relation to said planar surface and their other ends in similar relation to said grooves, means pivotally connecting said arms to said body intermediate their ends, a ring rotatably mounted in said groove, stud means on said ring engageable with one side edge of each of said arms, other stud means on said body and on the opposite side of each of said arms, and a compression spring interposed between each of said other stud means and the said opposite side of a respective sector arm.

11. A chuck according to claim 10, characterized in that said other stud means and said springs are located radially between said pivotally connecting means and the first said stud means.

References Cited in the file of this patent

UNITED STATES PATENTS

| | | |
|---|---|---|
| 190,043 | Hurd | Apr. 24, 1877 |
| 2,444,457 | Marks et al. | July 6, 1948 |
| 2,560,798 | Jensen | July 17, 1951 |
| 2,592,037 | Keiser | Apr. 8, 1952 |
| 2,627,195 | Sporket | Feb. 3, 1953 |